(12) United States Patent
Wilson (10) Patent No.: US 7,317,260 B2
(45) Date of Patent: Jan. 8, 2008

(54) WIND FLOW ESTIMATION AND TRACKING USING TOWER DYNAMICS

(75) Inventor: Kitchener Clark Wilson, Santa Barbara, CA (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 49 days.

(21) Appl. No.: 11/128,030

(22) Filed: May 10, 2005

(65) Prior Publication Data

US 2006/0033338 A1  Feb. 16, 2006

Related U.S. Application Data

(60) Provisional application No. 60/570,682, filed on May 11, 2004.

(51) Int. Cl.
*F03D 9/00* (2006.01)
*H02P 9/04* (2006.01)

(52) U.S. Cl. ...................................................... 290/44
(58) Field of Classification Search .................. 290/44
See application file for complete search history.

(56) References Cited

U.S. PATENT DOCUMENTS

| | | | | |
|---|---|---|---|---|
| 1,922,866 A | * | 8/1933 | Rosenberg et al. | 416/88 |
| 2,163,482 A | * | 6/1939 | Cameron | 416/88 |
| 2,501,696 A | * | 3/1950 | Souczek | 290/43 |
| 2,510,216 A | * | 6/1950 | Figley | 416/88 |
| 3,164,020 A | * | 1/1965 | Groner et al. | 73/861.78 |
| 3,185,128 A | * | 5/1965 | Moore et al. | 562/9 |
| 3,209,156 A | * | 9/1965 | Struble, Jr. | 290/54 |
| 3,399,567 A | * | 9/1968 | Back | 73/861.81 |
| 3,455,162 A | * | 7/1969 | Michener et al. | 73/861.78 |
| RE27,261 E | * | 12/1971 | Bromel et al. | 114/264 |
| 3,880,003 A | * | 4/1975 | Jameson | 73/861.78 |
| 3,990,305 A | * | 11/1976 | Wallman | 73/861.02 |
| 4,088,022 A | * | 5/1978 | Kalotay | 73/861.78 |
| 4,142,697 A | * | 3/1979 | Fradenburgh | 244/7 R |
| 4,205,943 A | * | 6/1980 | Vauthier | 416/86 |
| 4,219,303 A | * | 8/1980 | Mouton et al. | 415/7 |
| 4,242,043 A | * | 12/1980 | Poulsen | 416/11 |
| 4,313,059 A | * | 1/1982 | Howard | 290/54 |
| 4,364,323 A | * | 12/1982 | Stevenson | 114/265 |
| 4,383,182 A | * | 5/1983 | Bowley | 290/43 |
| 4,404,861 A | * | 9/1983 | Wass | 73/861.83 |

(Continued)

FOREIGN PATENT DOCUMENTS

DE  202 20 134 U1  4/2003

(Continued)

*Primary Examiner*—Darren Schuberg
*Assistant Examiner*—Pedro J. Cuevas
(74) *Attorney, Agent, or Firm*—Owen L. Lamb (57) ABSTRACT

A turbine control system for a variable speed electrical generator in a wind turbine mounted atop a support tower. The wind turbine converts wind energy into a driving torque applied to the generator. The control system includes a turbine support tower position sensor and may also include other tower acceleration and velocity sensors. A wind flow estimator uses the measured motion, generator rotation rate and blade pitch angle to predict wind flow over the swept area of the turbine's rotor, and the tower motion. The predicted wind flow and motion is used in the turbine control system to properly adjust its operating point, to tune the controller, to control the rotor rotation rate, and to damp tower oscillations.

24 Claims, 6 Drawing Sheets

U.S. PATENT DOCUMENTS

| | | | |
|---|---|---|---|
| 4,410,806 A * | 10/1983 | Brulle | 290/44 |
| 4,420,692 A * | 12/1983 | Kos et al. | 290/44 |
| 4,435,647 A * | 3/1984 | Harner et al. | 290/44 |
| 4,449,889 A * | 5/1984 | Belden | 416/16 |
| 4,459,861 A * | 7/1984 | Hoffmann | 73/861.78 |
| 4,511,115 A * | 4/1985 | Ludwigsen | 248/562 |
| D282,448 S * | 2/1986 | Hall | D10/96 |
| 4,576,520 A * | 3/1986 | Suh et al. | 405/224 |
| 4,630,996 A * | 12/1986 | Masaki | 416/16 |
| 4,662,786 A * | 5/1987 | Cherbonnier | 405/195.1 |
| 4,710,101 A * | 12/1987 | Jamieson | 416/32 |
| 4,798,092 A * | 1/1989 | Lagergren et al. | 73/861.77 |
| D301,988 S * | 7/1989 | Kruse et al. | D10/96 |
| 4,850,190 A * | 7/1989 | Pitts | 60/398 |
| 4,883,388 A * | 11/1989 | Cherbonnier | 405/195.1 |
| 4,886,397 A * | 12/1989 | Cherbonnier | 405/195.1 |
| 5,155,375 A * | 10/1992 | Holley | 290/44 |
| 5,160,219 A * | 11/1992 | Arlt | 405/195.1 |
| 5,182,887 A * | 2/1993 | Uno et al. | 52/167.1 |
| D335,096 S * | 4/1993 | Marsh | D10/96 |
| 5,213,470 A * | 5/1993 | Lundquist | 416/9 |
| 5,239,789 A * | 8/1993 | Uno et al. | 52/1 |
| 5,253,979 A * | 10/1993 | Fradenburgh et al. | 416/223 R |
| 5,278,773 A * | 1/1994 | Cousineau | 700/287 |
| 5,285,995 A * | 2/1994 | Gonzalez et al. | 248/550 |
| 5,289,041 A | 2/1994 | Holley | 290/44 |
| 5,299,912 A * | 4/1994 | Fradenburgh et al. | 416/87 |
| 5,422,826 A * | 6/1995 | Cousineau | 700/287 |
| 5,478,043 A * | 12/1995 | Wakui | 248/550 |
| 5,545,962 A * | 8/1996 | Wakui | 318/677 |
| 5,568,032 A * | 10/1996 | Wakui | 318/632 |
| 5,620,303 A * | 4/1997 | Moffitt et al. | 416/87 |
| 5,620,304 A * | 4/1997 | Matsuka et al. | 416/87 |
| 5,636,969 A * | 6/1997 | Matuska et al. | 416/87 |
| 5,642,982 A * | 7/1997 | Matuska et al. | 416/87 |
| 5,655,879 A * | 8/1997 | Kiely et al. | 416/87 |
| 5,735,670 A * | 4/1998 | Moffitt et al. | 416/87 |
| 5,750,897 A * | 5/1998 | Kato | 73/663 |
| 6,019,578 A * | 2/2000 | Hager et al. | 416/87 |
| 6,021,991 A * | 2/2000 | Mayama et al. | 248/550 |
| 6,030,177 A * | 2/2000 | Hager | 416/87 |
| 6,089,525 A * | 7/2000 | Williams | 248/550 |
| 6,091,161 A * | 7/2000 | Dehlsen et al. | 290/43 |
| 6,128,552 A * | 10/2000 | Iwai et al. | 700/280 |
| 6,216,059 B1 * | 4/2001 | Ierymenko | 700/280 |
| 6,327,957 B1 * | 12/2001 | Carter, Sr. | 91/41 |
| 6,398,497 B1 * | 6/2002 | Federici et al. | 416/87 |
| 6,531,788 B2 * | 3/2003 | Robson | 290/43 |
| 6,726,439 B2 * | 4/2004 | Mikhail et al. | 415/4.1 |
| 6,789,024 B1 * | 9/2004 | Kochan et al. | 702/45 |
| 6,876,099 B2 * | 4/2005 | Wobben | 290/44 |
| 6,902,370 B2 * | 6/2005 | Dawson et al. | 415/4.1 |
| 6,923,622 B1 * | 8/2005 | Dehlsen | 416/87 |
| 6,974,307 B2 * | 12/2005 | Antoune et al. | 416/9 |
| 7,071,578 B1 * | 7/2006 | Shibata et al. | 290/55 |
| 7,077,072 B2 * | 7/2006 | Wingett et al. | 114/312 |
| 7,117,120 B2 * | 10/2006 | Beck et al. | 702/182 |
| 2003/0127862 A1 | 7/2003 | Weitkamp | 290/44 |
| 2003/0151260 A1 | 8/2003 | Siegfriedsen | 290/44 |
| 2004/0084180 A1 * | 5/2004 | Shah et al. | 166/250.16 |
| 2004/0108729 A1 | 6/2004 | Wobben | 290/44 |
| 2005/0098485 A1 * | 5/2005 | Boyd et al. | 210/87 |
| 2006/0066111 A1 * | 3/2006 | Suryanarayanan et al. | 290/44 |
| 2006/0276999 A1 * | 12/2006 | Beck et al. | 702/182 |
| 2007/0075546 A1 * | 4/2007 | Avagliano et al. | 290/44 |

FOREIGN PATENT DOCUMENTS

| | | |
|---|---|---|
| DE | 102 32 021 A1 | 2/2004 |
| WO | WO 2004/074681 A1 | 9/2004 |
| WO | WO 2004/077068 A1 | 9/2004 |

* cited by examiner

WIND FLOW ESTIMATION AND TRACKING USING TOWER DYNAMICS

CROSS-REFERENCE TO RELATED APPLICATIONS

This application is a Continuation of and claims priority under 35 U.S.C. § 119(e) to U.S. Provisional Patent Application No. 60/570,682 "A Wind Speed Estimation And Tracking Using Tower Dynamics", which was filed on May 11, 2004, and which is incorporated herein by reference.

BACKGROUND OF THE INVENTION

1. Field of the Invention

The present invention relates to wind turbines, and more specifically, to a wind flow estimator for a wind turbine having a rotor driven by wind applying power to turn rotor blades.

2. Description of Related Art

Most existing wind turbines operate at constant speed. The rotor drives a generator, such as an induction generator, at a constant rotational speed. Constant speed operation is required for a direct link with a constant frequency electrical utility grid. Other more modern wind turbines operate at variable speed to produce DC power, which a converter changes to AC power synchronous with the attached power grid.

Constant speed turbines adapt to increasing wind speed by detecting an increase in rotor rotation rate and then increasing the power generated. This increases the load torque on the rotor and keeps it from speeding up. If this is insufficient, or causes unacceptable power fluctuations, the pitch of the rotor blades is changed to reduce the rotor torque provided by the wind. If the rotor speed is not in sync with the grid, power is not generated.

Variable speed turbines generate power at all wind speeds, but have favored operating points at each wind speed that generate optimal power without over-stressing the components. Striving to follow the operating points as wind speed increases, these turbines also sense rotor speed and use load torque and rotor blade pitch for control.

Control strategies based on detecting changes in rotor speed are limited in their effectiveness due to the substantial time lag between wind changes and rotor speed changes. Direct knowledge of wind flow is central to better control of the wind turbine and a means to estimate wind flow and track it over time provides for improved control. Current patents in this field include those of Holley (U.S. Pat. No. 5,155,375 and U.S. Pat. No. 5,289,041) in which the rotor rotation rate, blade pitch angle, wind torque and generator torque are combined to estimate wind flow.

To accurately track wind flow, it is necessary to determine the average wind flow over the area swept by the rotor blades of the wind turbine. Anemometers installed near to the area swept by the blades cannot accurately measure the average wind speed because they measure wind speed at a single location, whereas wind speed may vary over the area swept by the blades. Further, the blades after the wind pattern and remove energy from the wind, and a sensor behind the blade will not reflect the wind in front.

A rough estimate of the wind speed can be obtained by measuring rotor speed and electrical output power. Since forces other than the wind influence these parameters, this method is not sufficiently accurate.

In addition to controlling the turbine, it is desirable to damp the oscillations of the tower. The tower moves in response to the wind on its structure and on the rotor blades. Tower motion is inherently lightly damped and can oscillate substantially. Tower life is shortened by the associated mechanical flexing.

U.S. Pat. No. 4,435,647, to Harner, et al discloses tower-mounted wind turbine powered electric generating system, having a control to modulate rotor blade angle to maintain rated torque or power in turbulent wind. The control provides a blade angle command component, which adjusts the turbine rotor blade angle in a manner to provide aerodynamic damping of the tower primary resonant frequency in response to a predicted motion signal. The predicted motion signal is indicative of analytically anticipated longitudinal motion of the tower parallel to the rotor axis, as a filtered function of the blade angle reference signal.

U.S. Pat. No. 4,420,692, to Kos, et al discloses an accelerometer disposed on the support tower of a wind turbine electric generating system in the vicinity of the rotor. The accelerometer provides a motion signal indicative of acceleration of the tower in the direction of the rotor rotational axis. The signal is passed through a band-pass filter. A torque/power controlled blade pitch angle reference signal is generated for constant torque/power in response to wind turbulence. The band-pass filtered accelerometer signal is added to the blade reference signal and used to control the pitch angle of the rotor blades through a pitch change mechanism. This provides additional, positive aerodynamic damping to the tower by modulating the blade angle chosen for constant torque/power in response to wind turbulence.

The Holley patents (U.S. Pat. No. 5,155,375 and U.S. Pat. No. 5,289,041) estimate wind speed but not from tower measurements.

The Kos, et al and Harner, et al patents (U.S. Pat. No. 4,420,692 and U.S. Pat. No. 4,435,647) are concerned only with tower damping using measured acceleration through a bandpass or other simple filter. No attempt is made to estimate wind flow from tower measurements.

It is desirable to provide a turbine control system including a wind or water flow estimator that estimates and tracks wind or water flow using the motion of the turbine support structure, such as a tower or underwater tether, as it moves in response to the flow. The flow estimator results are then used in the turbine control system to properly adjust its operating point, to tune the controller, to control the rotor rotation rate, and to damp support structure oscillations.

SUMMARY OF THE INVENTION

The present invention relates to a power generating system in which a turbine is mounted on a support structure held stationary in the horizontal axis with reference to the wind or water flow. The turbine includes a rotor connected to a rotor hub. The rotor has a main blade section with an adjustable pitch angle. The main blade may have an extender blade with an adjusting device connected to the extender blade. A motor moves the extender blade between a retracted position relative to the main blade section to a more extended position to expose more or less of the rotor to the wind.

A turbine control system is provided including a fluid-flow estimator that estimates and tracks the wind or water flow using the measured motion of the support structure along with rotor rotation rate and blade pitch angle. The fluid-flow estimator is used in the turbine control system to properly adjust its operating point, to tune the controller (Proportional, Integral, Derivative, PID, state space, etc.), and to damp support structure oscillations.

In accordance with an aspect of the invention, the estimator may be used without a controller simply as a fluid and/or support structure monitor.

In accordance with a further aspect of the invention, the rotor speed is controlled to follow the fluid-flow.

In accordance with a further aspect of the invention, the rotor speed is held constant in spite of changes in fluid flow.

BRIEF DESCRIPTION OF THE DRAWINGS

The invention will be described in detail with reference to the drawings in which.

In these figures, similar numerals refer to similar elements in the drawings. It should be understood that the sizes of the different components in the figures may not be to scale, or in exact proportion, and are shown for visual clarity and for the purpose of explanation.

DESCRIPTION OF THE PREFERRED EMBODIMENTS

The invention is described herein with reference to a turbine mounted on a tower and driven by wind flow. The principles of the invention also apply to devices that are tethered and driven and/or buoyed by air or water wherein the support structure is a cable, rod or the like. An example of such devices is disclosed in U.S. Pat. No. 6,091,161 of Dehlsen, et al. granted on Jul. 18, 2000.

Figure 1:
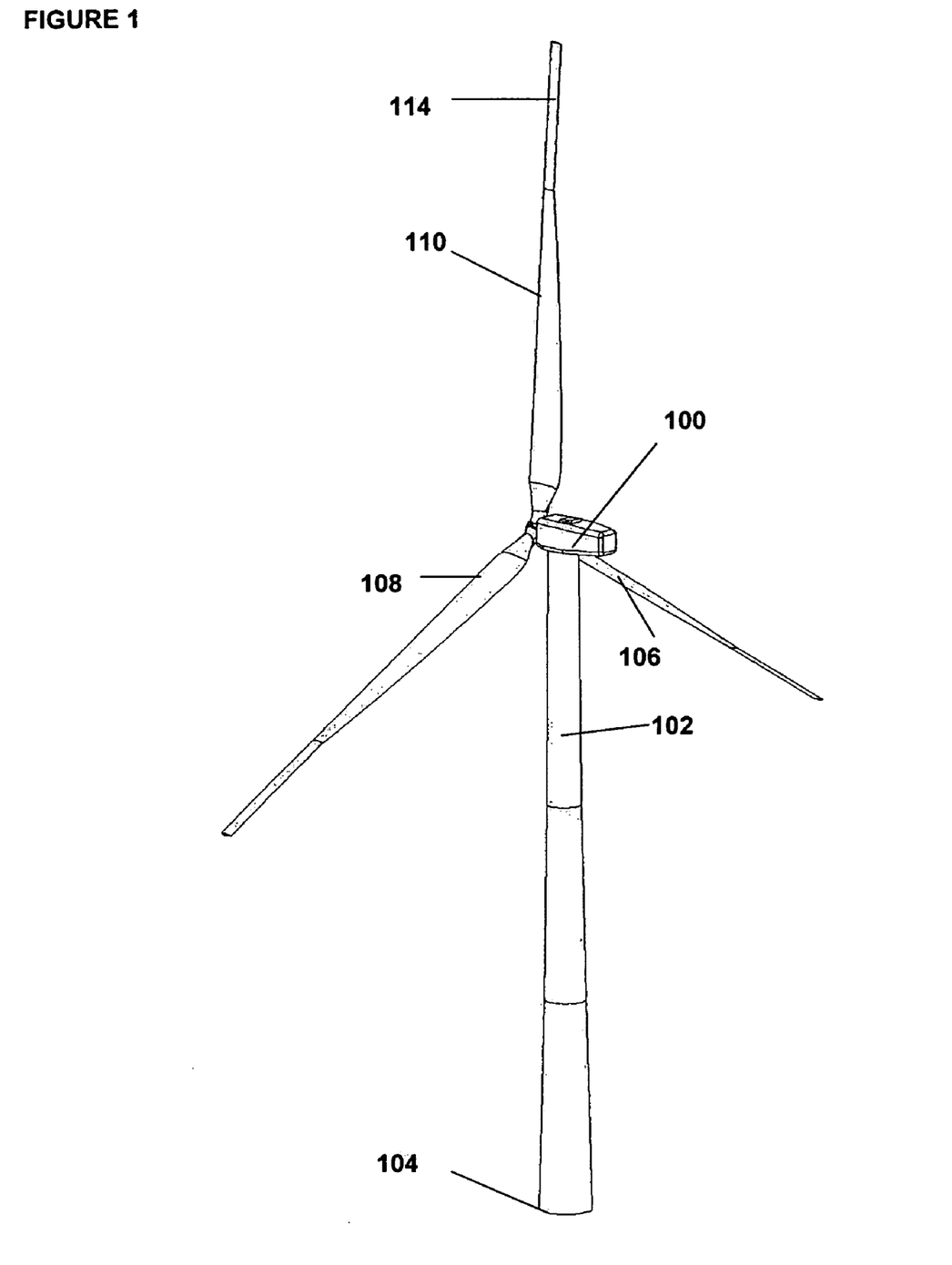
FIG. 1 illustrates a wind power-generating device in which the invention is embodied.

FIG. 1 illustrates a wind power-generating device. The wind power-generating device includes an electric generator housed in a turbine 100, which is mounted atop a tall tower structure 102 anchored 104 to the ground. The turbine 100 is maintained in the horizontal plane and into the path of prevailing wind current by a yaw control mechanism. The turbine has a rotor with variable pitch blades, 106, 108, 110, which rotate in response to wind. Each blade has a blade base section attached to a rotor shaft that drives the turbine 100 and may have blade pitch angle control capability and/or a blade extension section 114 that is variable in length to provide a variable diameter rotor. The rotor diameter may be controlled by extending or retracting the blade extensions to fully extend the rotor at low flow velocity and to retract the rotor as flow velocity increases such that the loads delivered by or exerted upon the rotor do not exceed set limits. The pitch of and entire blade may be varied while only a portion of the blade is extended.

The power-generating device is held by the tower structure in the path of the wind current such that the turbine 100 is held in place horizontally in alignment with the wind current. The electric generator within the turbine 100 is driven by the rotor to produce electricity and is connected to power carrying cables inter-connecting to other units and/or to a power grid.

Conventional rotors utilize blades of fixed length, joined at a rotating hub. These blades may be of variable pitch (selectively rotatable about their longitudinal axes) in order to alter the angle of attack relative to the incoming wind flow, principally for power shedding in high flow velocities. Alternatively, these blades may be fixed pitch or stall-regulated, wherein blade lift and therefore power capture falls off dramatically as wind speed exceeds some nominal value. Both variable pitch and stall regulated rotor blades with fixed diameters are well known in the art.

The present invention provides a method and a controller for operating a wind turbine in order to obtain greater efficiency in conversion of wind energy to electrical energy. The controller controls the wind turbine to compensate for varying wind flows with knowledge of the wind flow and of the tower motion, and it also contains a tower motion damper that damps the tower motion.

The wind power supplies torque to a turbine shaft, and the torque is a function of the wind speed, the rotor speed, and the blade pitch angle and length. Since wind speed is variable, the torque is variable. The rotating shaft turns a drivetrain connected to the generator. The drivetrain has gears that increase the rotational speed to turn a generator. The generator includes a power converter to convert the generated electrical power to electrical power compatible with an electrical utility grid.

Figure 2:
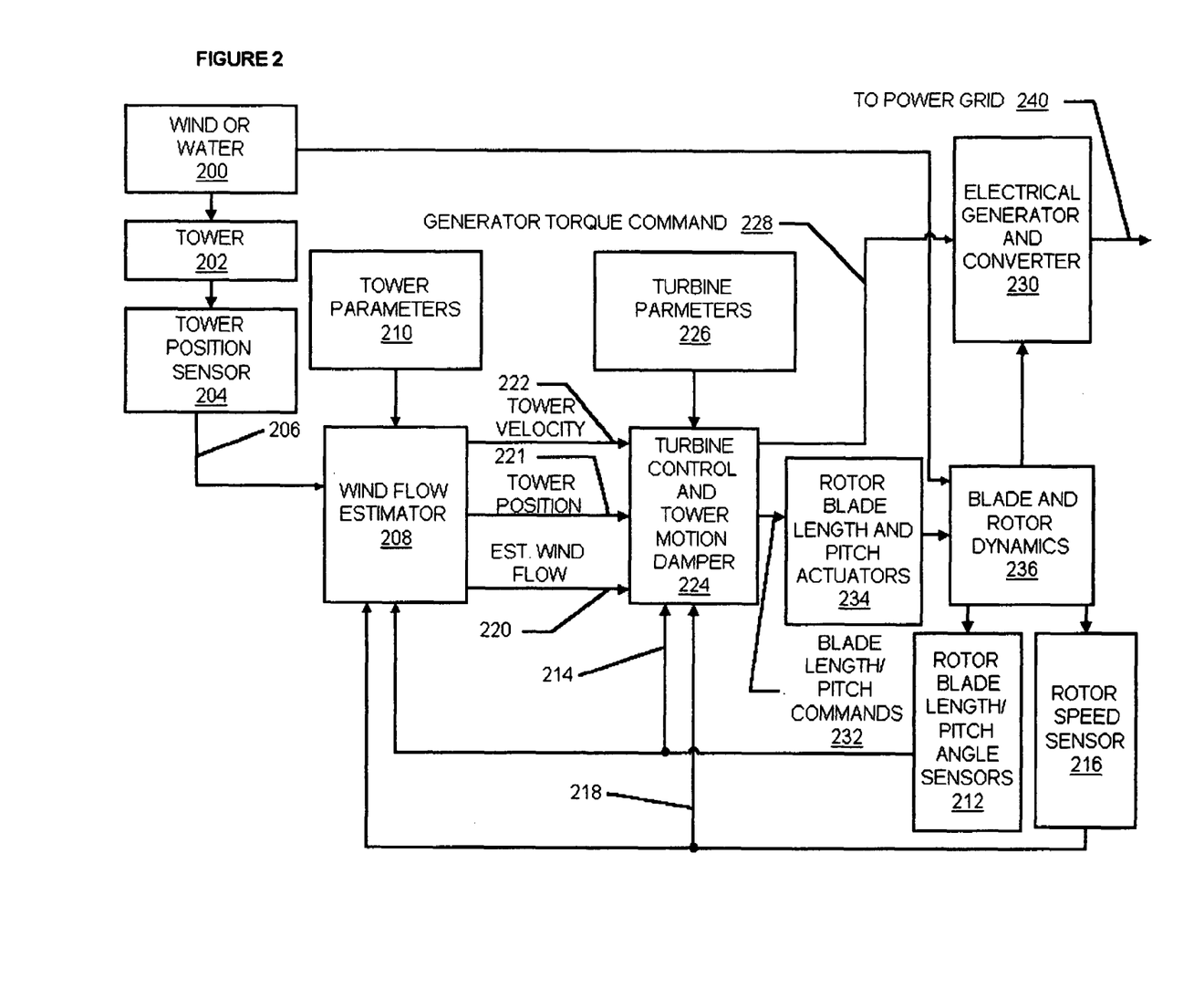
FIG. 2 is a block diagram of a turbine control system in which the invention is embodied.

FIG. 2 is a block diagram that illustrates the control system for a pitch angle-regulated wind turbine. The present invention would also have application to wind turbines that are not pitch angle-regulated (e.g., stall regulated), in which case the pitch angle is taken as a constant in the control system calculations. The present invention would also have application to wind turbines that utilize extendible rotor blades such as described in U.S. Pat. No. 6,726,439.

A wind current or a water current 200 exerts a force on the tower 202 and the rotor blade 236. A tower position sensor 204 located on the tower 202 provides output 206 to a wind flow estimator 208. Other tower parameters 210 are also input to the wind estimator 208.

A blade parameter (for example blade length and or blade pitch angle) sensor 212 senses the pitch angle of the rotor blades and or the blade length for wind turbines that utilize extendible rotor blades. The length/pitch angle output 214 is supplied to the wind flow estimator 208 by the blade length/pitch angle sensor 212. A rotor speed sensor 216 senses rotor speed and its output 218 is supplied to the wind flow estimator 208.

The wind flow estimator 208 provides an estimated wind flow 220 and tower position 221 and velocity 222 to a turbine control and tower motion damper 224. Other turbine parameters 226 are also input to the turbine control and tower motion damper 224. Using the estimated wind flow input 220, tower position input 221 and velocity input 222, blade length/pitch measurement 214, and rotor speed measurement 218, the turbine control 224 outputs a desired generator torque command 228 to the electrical converter portion of the generator 230, and a desired blade length/pitch command 232 (or commands) to the rotor blade length/pitch actuator 234. The rotor blade length/pitch actuator 234 controls the blade length/pitch angle of the rotor blades 236.

If blade length control is implemented, the desired blade length command 232 is sent to the rotor blade length actuator 234. The rotor blade length actuator 234 controls the length of the rotor blades 236.

If both blade length control and blade pitch control are implemented, the desired blade length and blade pitch commands 232 are both sent to their respective actuators 234. The rotor blade length actuator 234 then controls both the length and pitch of the rotor blades 236.

The electrical generator 230 is connected to the electrical converter 238, which provides real time control of the line voltage or power factor. The power output 240 from the generator 230 is cabled to the utility power grid. The torque command 228 is used to alter the power generation and also affects the rotor rotation rate.

METHOD OF OPERATION

Figure 3:
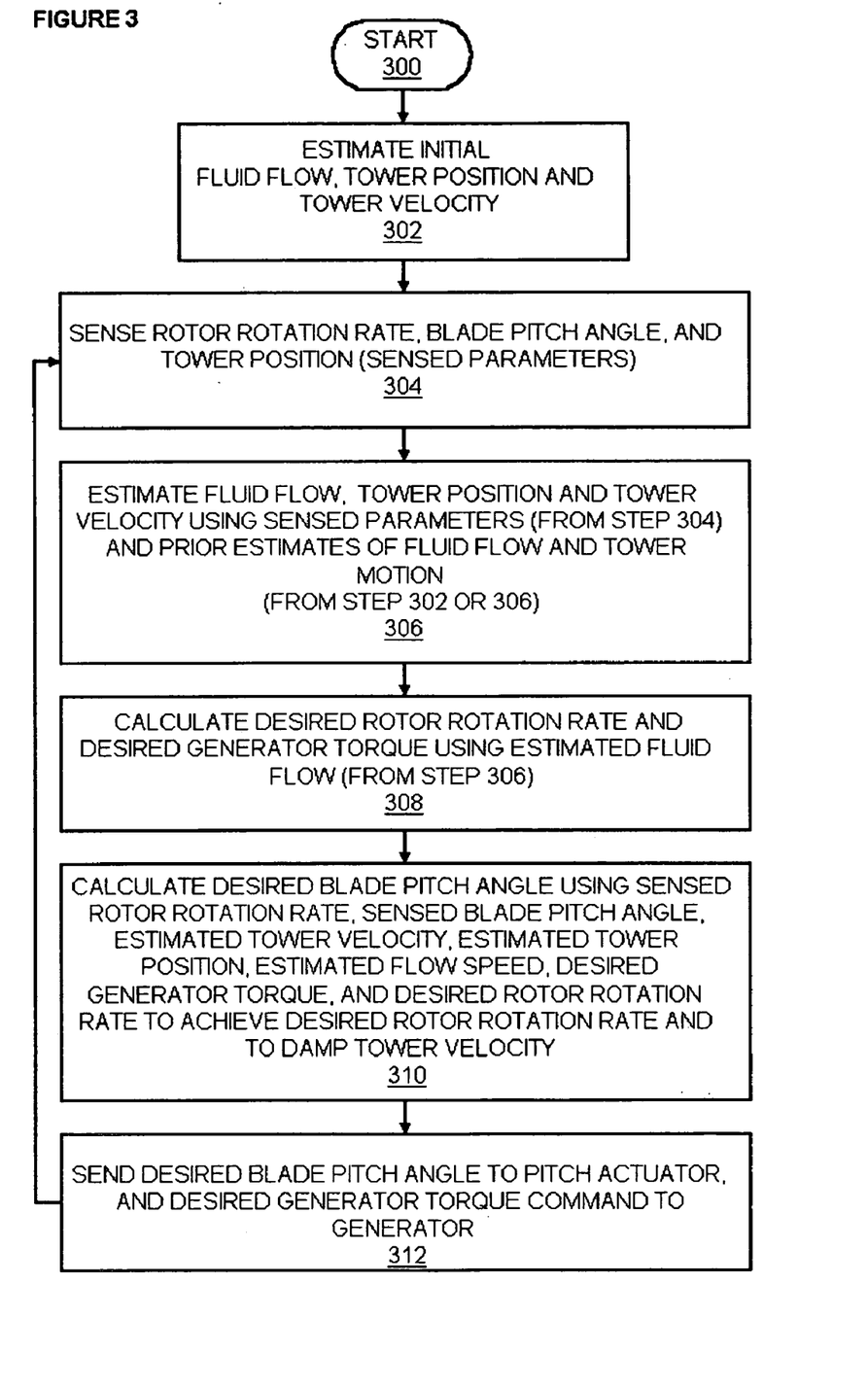
FIG. 3 is a flow chart of a method by which the invention is practiced.

Refer to FIG. 3, which is a flow chart of a method by which the invention is practiced. The flow starts at block 300. First, at block 302, the initial wind flow and tower position and velocity are estimated. At block 304 the rotor rotation rate, blade pitch angle, and tower position are sensed, collectively refered to as "sensed parameters".

At block 306, the wind flow and tower position and velocity are estimated by the wind flow estimator using the sensed parameters and prior estimates of wind flow and tower motion from block 302 or the previous pass through block 306.

At block 308 the desired rotor rotation rate is calculated using estimated wind flow from block 306.

At block 310 the desired blade pitch angle and generator torque are calculated using sensed rotor rotation rate, sensed blade pitch angle, estimated tower velocity, estimated tower position, estimated wind flow, and desired rotor rotation rate to achieve a desired rotor rotation rate and to damp tower motion.

Although not stated in block 310, it will be understood by those skilled in the art that blade length alone or in combination with blade pitch angle may varied. If so, then the desired blade length is calculated using sensed rotor rotation rate, sensed blade length, estimated tower velocity, estimated wind flow, desired generator torque, and desired rotor rotation rate to achieve a desired rotor rotation rate and to damp tower velocity.

Finally at block 312 the desired blade pitch angle command is sent to the rotor blade pitch actuator, and the desired generator command (such as torque) is sent to the electrical converter. The flow returns to block 304 and the cycle is continuously repeated.

Although not stated in block 312, it will be understood by those skilled the art that blade length alone or in combination with blade pitch angle can be varied. If such is the case, then at block 312 the desired blade length command is sent to the rotor blade length actuator, and the desired generator command s sent to the generator. The flow returns to block 304 and the cycle is continuously repeated.

Alternately, the generator rotation rate is sensed and, after accounting for intervening gears, used as a measure of the rotor rotation rate.

Turbine Dynamics

A simplified mathematical model of a turbine is given by:

tower acceleration:

$$a_{tower} = \left(\frac{\rho A}{2m_{tower}}\right)(V_{wind} - v_{tower})^2 C_T\left(\frac{R\Omega_r}{V_{wind}\cos(\theta_{wind} - \psi_{turbine}) - v_{tower}}, \delta\right) - [\omega_{tower}^2 p_{tower} + 2\xi_{tower}\omega_{tower}v_{tower}]$$

tower velocity:

$$\dot{v}_{tower} = a_{tower}$$

tower position:

$$\dot{p}_{tower} = v_{tower}$$

rotor rotation rate:

$$\dot{\Omega}_r = \left(\frac{\rho RA}{2I_r}\right)(V_{wind} - v_{tower})^2 C_Q\left(\frac{R\Omega_r}{V_{wind}\cos(\theta_{wind} - \psi_{turbine}) - v_{tower}}, \delta\right) - \left(\frac{I_g}{I_g + I_r}\right)[\omega_{drive}^2 \varphi_{windup} + 2\xi_{drive}\omega_{drive}(\Omega_r - \Omega_g)]$$

generator rotation rate:

$$\dot{\Omega}_g = \left(\frac{I_r}{I_g + I_r}\right)[\omega_{drive}^2 \varphi_{windup} + 2\xi_{drive}\omega_{drive}(\Omega_r - \Omega_g)] - \frac{Q_g}{I_g}$$

rotor-generator shaft angular windup:

$$\dot{\psi}_{windup} = \Omega_r - \Omega_g$$

where
    $\rho$ the known air density
    A the known area of the rotor disc
    $m_{tower}$ the known effective mass of the tower
    $\theta_{wind}$ the direction of the wind
    $V_{wind}$ the velocity of the wind in the $\theta_{wind}$ direction
    $\psi_{turbine}$ the known direction of the turbine
    R the known rotor radius
    $\omega_{tower}$ the known fundamental frequency of the tower motion
    $\xi_{tower}$ the known damping ratio of the tower motion
    $C_T[,]$ the known aerodynamics of the wind thrust on the tower
    $I_r$ the known rotor moment of inertia
    $I_g$ the known generator moment of inertia
    $\omega_{drive}$ the known fundamental frequency of the drive train motion
    $\xi_{drive}$ the known damping ratio of the drive train motion
    $C_Q[,]$ the known aerodynamics of the wind torque on the rotor
    $Q_g$ the generator torque to be selected
    $\delta$ the pitch angle of all blades to be selected It is seen that the $V_{wind}$, $\psi_{turbine}$, and $\theta_{wind}$ triple always appear as the combination $$s_{wind} = V_{wind}\cos(\theta_{wind} - \psi_{turbine})$$

and, as a result, $V_{wind}$ and $\theta_{wind}$ cannot be individually estimated from turbine dynamics. However $s_{wind}$ can be estimated. $V_{wind}$ is determinable only if a measurement of $\theta_{wind}$ and $\psi_{turbine}$ are available as $$V_{wind} = \frac{s_{wind}}{\cos(\theta_{wind} - \psi_{turbine})}$$

Wind speed is, on average, a slowly changing quantity affected by gusts and environmental forces. A simple approach to modeling wind speed is simply to consider its rate of change to be a time invariant stochastic variable:

$$\frac{d}{dt} s_{wind} = \Delta_{windSpeedRate}$$

where $\Delta_{windSpeedRate}$ is a zero mean Gaussian white noise sequence representing the affect of wind gusts and the environment. This model describes wind speed as being nearly constant but affected by gusts and the environment. An estimator based on this model will directly estimate the wind speed $s_{wind}(t)$.

Another more complex model would be one that recognizes that, nominally, wind speed is not constant and that any change in it is correlated in time (if it starts to change, it will likely continue to change in the same direction):

$$\frac{d}{dt} \dot{s}_{wind} = \Delta_{windSpeedAcceleration}$$

$$\frac{d}{dt} s_{wind} = \dot{s}_{wind}$$

where $\Delta_{windSpeedAcceleration}$ is a zero mean Gaussian white noise sequence representing the affect of wind gusts and the environment. This model describes the rate of change of wind speed (wind acceleration) as being nearly constant but affected by gusts and the environment. An estimator based on this model will estimate the wind speed rate of change $\dot{s}_{wind}(t)$ and the wind speed $s_{wind}(t)$.

Other wind flow models are considered including those that model wind flow as having first or second order dynamics, are driven by colored noise, etc. Here the term wind flow is used to describe any and all wind model parameters and variables including the wind speed and higher order derivatives, and natural frequencies and damping coefficients.

Wind Tower Dynamics and Tower Measurements

Using the simpler model of wind flow, the tower and wind flow dynamics are described by the coupled stochastic differential equations $$\dot{v}_{tower} = a_{tower}(v_{tower}, p_{tower}, s_{wind}, \Omega_g, \delta)$$

$$\dot{p}_{tower} = v_{tower}$$

$$\dot{s}_{wind} = \Delta_{windSpeedRate}$$

where the tower acceleration forcing function is $$a_{tower}(v_{tower}, p_{tower}, s_{wind}) \equiv \frac{\rho A}{2 m_{tower}} (s_{wind} - v_{tower})^2 C_T\left(\frac{R \Omega_g}{s_{wind} - v_{tower}}, \delta\right) -$$

-continued $$[\omega_{tower}^2 p_{tower} + 2 \xi_{tower} \omega_{tower} v_{tower}]$$

$\underline{x} = [v \ p \ s]^T$ are the states, and the rotor rotation rate in the $C_T(\ )$ term is replaced by the similar and more generally measured generator rotation rate after accounting for any gearing between the two. This approximation ignores the angular windup of the rotor shaft.

Initially the measurement of tower acceleration is included as it is often measured on turbines to monitor vibration:

$$y = \frac{\rho A}{2 m_{tower}} (s_{wind} - v_{tower})^2 C_T\left(\frac{R \Omega_g}{s_{wind} - v_{tower}}, \delta\right) -$$

$$[\omega_{tower}^2 p_{tower} + 2 \xi_{tower} \omega_{tower} v_{tower}]$$

Linearizing these equations about a quiescent operating point $\hat{\underline{x}} = [\hat{v} \ \hat{p} \ \hat{s}]^T$, the linear model of the state perturbation from $\hat{\underline{x}}$ is $$\partial \underline{x} = \begin{bmatrix} a_v & a_p & a_s \\ 1 & 0 & 0 \\ 0 & 0 & 0 \end{bmatrix} \partial \underline{x} + \begin{bmatrix} 0 \\ 0 \\ 1 \end{bmatrix} \Delta_{windSpeedRate}$$

$$= \underline{A} \partial \underline{x} + \underline{b} \Delta_{windSpeedRate}$$

$$\partial y = [a_v \ a_p \ a_s] \partial \underline{x}$$

$$= \underline{c} \partial \underline{x}$$

where $a_w$ is the partial derivative of $a_{tower}(\ )$ with respect to w evaluated at the operating point. The observability matrix of this system is $$\Theta = \begin{bmatrix} \underline{C} \\ \underline{CA} \\ \underline{CAA} \end{bmatrix} = \begin{bmatrix} a_v & a_p & a_s \\ (a_v^2 + a_p) & a_v a_p & a_v a_s \\ a_v(a_v^2 + 2a_p) & a_p(a_v^2 + a_p) & a_s(a_v^2 + a_p) \end{bmatrix}$$

where the second and third columns are linearly related ($III = a_s II/a_p$) indicating the matrix still does not have sufficient rank (3, the number of states). The state vector cannot be estimated from tower acceleration measurements alone.

Adding a tower velocity measurement $$\partial \underline{y} = \begin{bmatrix} a_v & a_p & a_s \\ 1 & 0 & 0 \end{bmatrix} \partial \underline{x}$$

$$= \underline{C} \partial \underline{x}$$

$$\Theta = \begin{bmatrix} \underline{C} \\ \underline{CA} \\ \underline{CAA} \end{bmatrix} = \begin{bmatrix} a_v & a_p & a_s \\ 1 & 0 & 0 \\ a_v^2 + a_p & a_v a_p & a_v a_s \\ a_v & a_p & a_s \\ a_v(a_v^2 + 2a_p) & a_p(a_v^2 + a_p) & a_s(a_v^2 + a_p) \\ a_v^2 + a_p & a_v a_p & a_v a_s \end{bmatrix}$$

where the second and third columns are linearly related and the observability matrix does not have sufficient rank. The state vector cannot be estimated from tower acceleration and velocity measurements alone.

If only position is measured, $$\partial y = [0 \ 1 \ 0] \partial x$$
$$= \underline{c} \partial x$$

$$\Theta = \begin{bmatrix} 0 & 1 & 0 \\ 1 & 0 & 0 \\ a_v & a_p & a_s \end{bmatrix}$$

The observability matrix has sufficient rank. The state vector is now observable and can be estimated from tower position measurements alone.

Wind flow estimation using tower motion requires tower position measurements. Tower acceleration or velocity are added to improve the estimation accuracy and responsiveness and robustness in a noisy environment.

Sensors

Support structure position is measured with centimeter accuracy using commercial differential Global Positioning receivers with Real Time Kinematic ability such as those from Topcon and other manufacturers. These devices use a single fixed and calibrated receiver in the vicinity of a multitude of turbines, and a receiver on each support structure. Support structure position is determined differentially with respect to the calibrated site.

A less expensive position sensor is a tilt sensor mounted at the top of a support structure that is a tower and whose signal is a measure of the tower position as the tower tilts while moving back and forth. Typically these devices have 0.01 degree repeatability. If the tower were a rigid structure with height H, the horizontal position is $$\Delta = H \sin(\theta_{tilt})$$
$$\approx H \theta_{tilt}$$

for small tilt angles. In actuality the tower is not rigid and the relationship between position and tilt angle must also account for its bending dynamics.

Tilt sensors all work by seeking the direction of gravity, and this is corrupted by the tower acceleration as $$\tan(\theta_{reported\_tilt}) = \frac{g \sin(\theta_{actual\_tilt}) + a_{tower}}{g \cos(\theta_{actual\_tilt})}$$

$$\theta_{reported\_tilt} \approx \theta_{actual\_tilt} + \frac{a_{tower}}{g}$$

where g is the acceleration of gravity. There are two ways to handle this corruption. The simplest is to wait until the measured acceleration is zero and the reported and actual tilt angles agree. Since acceleration is rarely zero when sampled, an implementation would use an acceleration zero-crossing detector to signal tilt angle acquisition. This manner produces occasional position determinations.

The second manner to handle acceleration corruption is to subtract the measured acceleration offset term, $$\frac{a_{tower}}{g}.$$

This manner renders all position determinations useable.

Other position sensors include laser and other optical range finders.

Support structure velocity is measured using commercial Doppler radar, laser, sonar, or RF systems with a fixed target.

Support structure acceleration is measured using any number of commercial accelerometers such as the PCH1026 by PCH Engineering having 0.015 m/s/s RMS noise floor.

For support structures that are tethered devices such as for underwater and lighter-than-air turbines that are held by cables, position may be determined or replaced by measuring cable parameters such as tension.

Wind Flow and Tower Motion Estimation Based on Tower Measurements

The estimator is a state estimator based on the mathematical model. It is a least squares, pole-placement, Kalman, $H_\infty$ or other type that is linearized about an operating point or not. Here a Kalman filter approach without operating point linearization is illustrated.

A Kalman filter is a computational algorithm that processes a time sequence of measurements to deduce an optimum estimate of the past, present, or future state of a system. This filter uses a model that characterizes the motion of the state, the measurements in terms of the state, and the statistical uncertainties of the model and of the measurements. Given the discrete stochastic nature of the wind model, the discrete Kalman filter is a logical approach to solving it.

The previous differential model is modified as $$\overset{*}{v}_{tower} = a^*_{tower}$$
$$\overset{*}{p}_{tower} = v_{tower}$$
$$\overset{*}{s}_{wind} = \Delta_{windSpeedRate}$$

$$\overset{*}{x} = \begin{bmatrix} 0 & 0 & 0 \\ 1 & 0 & 0 \\ 0 & 0 & 0 \end{bmatrix} x + \begin{bmatrix} 1 \\ 0 \\ 0 \end{bmatrix} a^*_{tower} + \begin{bmatrix} 0 \\ 0 \\ 1 \end{bmatrix} \Delta_{windSpeedRate}$$

$$= \underline{A} x + \underline{b} a^*_{tower} + \underline{e} \Delta_{windSpeedRate}$$

where ( )* implies a measurement, and the commonly measured tower acceleration, $a^*_{tower}$, is used to drive the tower velocity state. This makes for a mathematically and implementationally convenient linear time invariant state model. Because data and the computer code implementation of an estimator is discrete in nature with period T, a discrete state variable model of the system is needed:

$$x(t_{i+1}) = e^{AT} \underline{x}(t_i) + a^*_{tower}(t_i) \left( \int_0^T e^{A(T-\lambda)} d\lambda \right) \underline{b} +$$
$$\int_0^T e^{A(T-\lambda)} \underline{b} \Delta_a(\lambda) d\lambda + \int_0^T e^{A(T-\lambda)} \underline{d} \Delta_{windSpeedRate}(\lambda) d\lambda$$

$$= \begin{bmatrix} 1 & 0 & 0 \\ T & 1 & 0 \\ 0 & 0 & 1 \end{bmatrix} x(t_i) + \begin{bmatrix} T \\ \frac{T^2}{2} \\ 0 \end{bmatrix} a^*_{tower}(t_i) + \underline{\Delta x}(t_i)$$

$$= \Phi x(t_i) + \gamma a^*_{tower}(t_i) + \underline{\Delta x}$$

$$E[\underline{\Delta x} \underline{\Delta x}^T] = T^2 \begin{bmatrix} \sigma_a^2 & \frac{T}{2}\sigma_a^2 & 0 \\ \frac{T}{2}\sigma_a^2 & \frac{T^2}{4}\sigma_a^2 & 0 \\ 0 & 0 & \sigma_{windSpeedRate}^2 \end{bmatrix}$$

Here the acceleration measurement noise, $\underline{\Delta}_a$, is included, $E[\underline{\Delta x}\underline{\Delta x}^T]$ is the expected value of $\underline{\Delta x}\underline{\Delta x}^T$ (the covariance of the stochastic state noise term $\underline{\Delta x}$) assuming a discrete time stochastic variable, $\sigma_a^2$ is the acceleration measurement noise variance, and $\sigma_{windSpeedRate}^2$ is the wind acceleration state noise variance. The acceleration noise is given by the acceleration sensor accuracy specifications, and the wind acceleration noise variance is selected to tune the filter response.

An investigation into the observability of this model indicates both acceleration and position are required in the estimator. Given the simplicity of acquiring high rate acceleration measurements, and the possibly intermittent position measurements (e.g. zero crossing on tilt sensor), two non-linear measurement models are used: one when only acceleration is available, and one when both acceleration and position are collected. The possibly intermittent position data is used for full state correction while the regularly available acceleration data smoothly fills in (interpolates) between the position updates. If only acceleration is available, the measurement scalar is $$y_{acceleration\_only} = \frac{\rho A}{2 m_{tower}} [s_{wind}(t_i) - v_{tower}(t_i)]^2$$
$$C_T \left( \frac{R\Omega_g^*(t_i)}{s_{wind}(t_i) - v_{tower}(t_i)}, \delta^*(t_i) \right) -$$
$$[\omega_{tower}^2 p_{tower}(t_i) + 2\xi_{tower}\omega_{tower}v_{tower}(t_i)]$$
$$= f[x(t_i)]$$

If position is also available, the measurement vector is $$\underline{y}_{accelerations\_and\_position} = \begin{bmatrix} \frac{\rho A}{2 m_{tower}} [s_{wind}(t_i) - v_{tower}(t_i)]^2 \\ C_T \left( \frac{R\Omega_g^*(t_i)}{s_{wind}(t_i) - v_{tower}(t_i)}, \delta^*(t_i) \right) - \\ p_{tower}(i) \\ [\omega_{tower}^2 p_{tower}(t_i) + 2\xi_{tower}\omega_{tower}v_{tower}(t_i)] \end{bmatrix}$$
$$= \underline{f}[\underline{x}(t_i)]$$

The filter begins by having a prior filtered value of the state vector $\underline{x}$ and knowledge of its covariance (statistical uncertainty in its value) and predicting what the state and the measurement will be at the next data time:

$$\underline{x}_{predicted}(t_{i+1}) = \Phi \underline{x}_{filtered}(t_i) + \gamma a^*_{tower}(t_i)$$

$$\underline{y}_{predicted}(t_{i+1}) = \underline{f}[\underline{x}_{predicted}(t_{i+1})]$$

along with their covariances $$P_{xpredicted} = \Phi P_{xfiltered} \Phi^T + T^2 \begin{bmatrix} \sigma_a^2 & \frac{T}{2}\sigma_a^2 & 0 \\ \frac{T}{2}\sigma_a^2 & \frac{T^2}{4}\sigma_a^2 & 0 \\ 0 & 0 & \sigma_s^2 \end{bmatrix}$$

$$\underline{P}_{ypredicted} = \underline{f}_{\underline{x}}[\underline{x}_{predicted}(t_{i+1})] \underline{P}_{xpredicted} \underline{f}_{\underline{x}}^T[\underline{x}_{predicted}(t_{i+1})] + \underline{P}_y$$

If there is only an acceleration measurement then $$\underline{f}_{\underline{x}}[\hat{\underline{x}}] = [\, a_v|_{\underline{x}=\hat{\underline{x}}} \quad a_p|_{\underline{x}=\hat{\underline{x}}} \quad a_s|_{\underline{x}=\hat{\underline{x}}} \,]$$

$$a_s|_{\underline{x}=\hat{\underline{x}}} \approx \frac{a_{tower}[\hat{v}, \hat{p}, \hat{s}_{wind} + \Delta s, t_n] - a(\hat{v}, \hat{p}, \hat{s}_{wind}, t_n)}{\Delta s}$$

$$a_v|_{\underline{x}=\hat{\underline{x}}} = -\left(a_s|_{\underline{x}=\hat{\underline{x}}} + 2\xi_{tower}\omega_{tower}\right)$$

$$a_p|_{\underline{x}=\hat{\underline{x}}} = -\omega_{tower}^2$$

$$\underline{P}_y = \sigma_a^2$$

where $\Delta s$ is a perturbation used to estimate the partial derivative term. If there are acceleration and also position measurements then $$\underline{f}_{\underline{x}}[\hat{\underline{x}}] = \begin{bmatrix} a_v|_{\underline{x}=\hat{\underline{x}}} & a_p|_{\underline{x}=\hat{\underline{x}}} & a_s|_{\underline{x}=\hat{\underline{x}}} \\ 0 & 1 & 0 \end{bmatrix}$$

$$\underline{P}_y = \begin{bmatrix} \sigma_a^2 & 0 \\ 0 & \sigma_p^2 \end{bmatrix}$$

where $\sigma_p^2$ is the position measurement variance given by the position sensor accuracy specification. Having predicted forward one time step, the measurements at that time are collected and used to filter (correct) the state as $$\underline{K} = \underline{P}_{xpredicted} \underline{f}_{\underline{x}}^T[\underline{x}_{predicted}(t_{i+1})] \underline{P}_{ypredicted}^{-1}$$

$$\underline{x}_{filtered}(t_{i+1}) = \underline{x}_{predicted}(t_{i+1}) + \underline{K}[\underline{y}_{measured}(t_{i+1}) - \underline{y}_{predicted}(t_{i+1})]$$

$$\underline{P}_{xfiltered} = \{\underline{I} - \underline{K}\underline{f}_{\underline{x}}[\underline{x}_{predicted}(t_{i+1})]\} \underline{P}_{xpredicted}$$

This continues onward as each datum arrives. Given the small number of state variables (3), these matrix calculations are trivial. To begin the algorithm, an initial guess of the state and of its covariance must be provided: $\underline{x}(0)$ and $\underline{P}_{xfiltered}(0)$.

Note that the measurement prediction uses $a^*_{tower}(t_i)$ while the state correction uses $a^*_{tower}(t_{i+1})$, and the next prediction will also uses $a^*_{tower}(t_{i+1})$. Theoretically this mixing of measurements in the state propagation and state correction steps is contrary to the conventional Kalman algorithm derivational assumptions, but practically it has no affect.

Alternately, the nonlinear measurement equations are linearized about an operating point and the resulting two steady state K's (one for acceleration alone and one for acceleration and position) precalculated and used without having to propagate covariances.

Alternately, tower velocity replaces acceleration as a measurement to fill in between position updates.

Alternately more complex models of wind flow that include wind acceleration or other dynamic modeling terms are used.

Simulated Results

Figure 4:
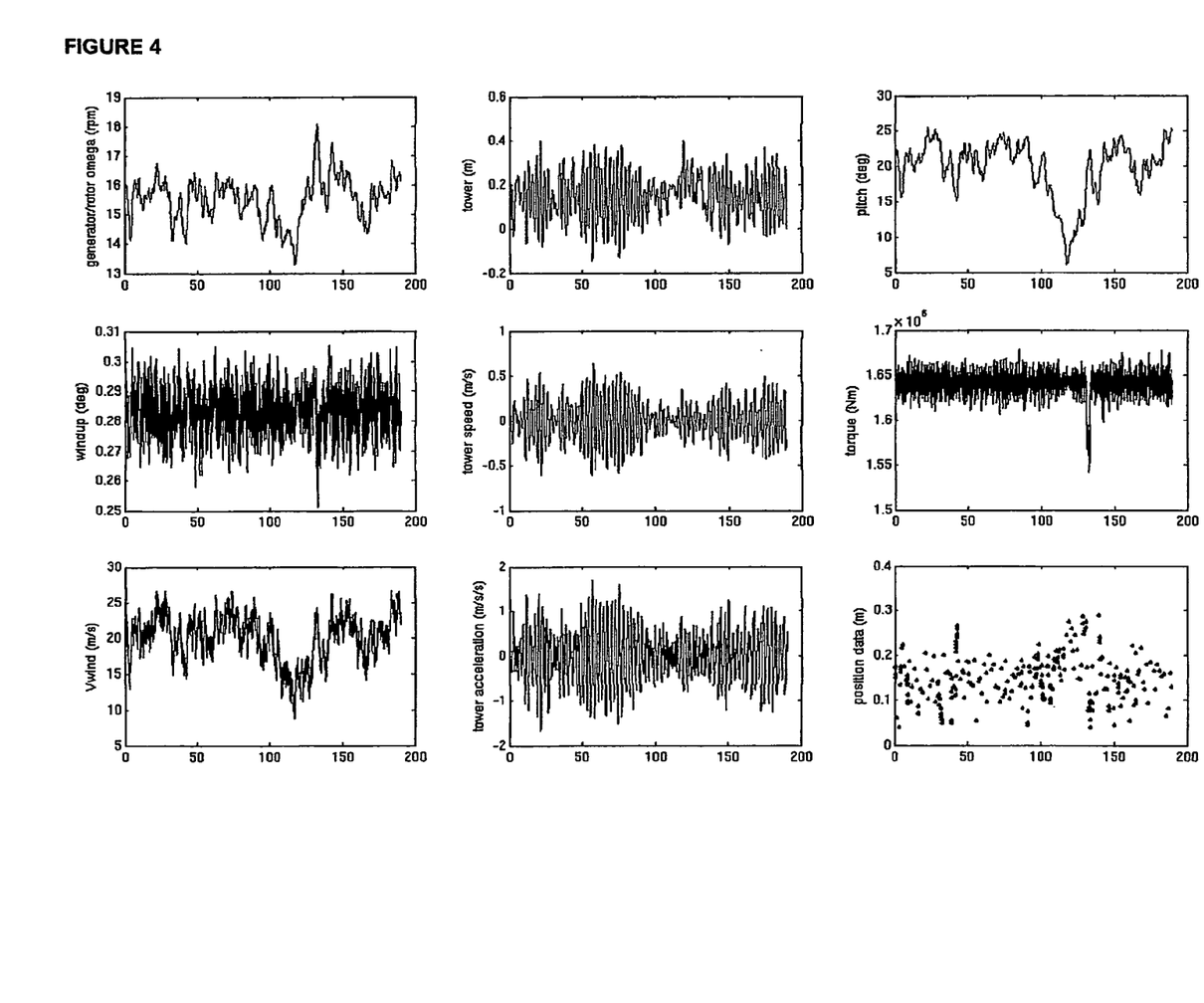
FIG. 4 comprises nine graphs in which simulated parameters are plotted.

A wind turbine in turbulent wind conditions is simulated in FIG. 4 wherein the wind speed, pitch, torque, and generator/rotor dynamics, and tower dynamics are shown in nine graphs in which simulated parameters are plotted. Also shown is the intermittent tilt sensor position data selected on acceleration zero-crossings. The turbine is in closed loop control using a simple PI compensator regulating the generator rpm by controlling the blade pitch, and generator torque is selected according to a table indexed by pitch and generator rpm.

Figure 5:
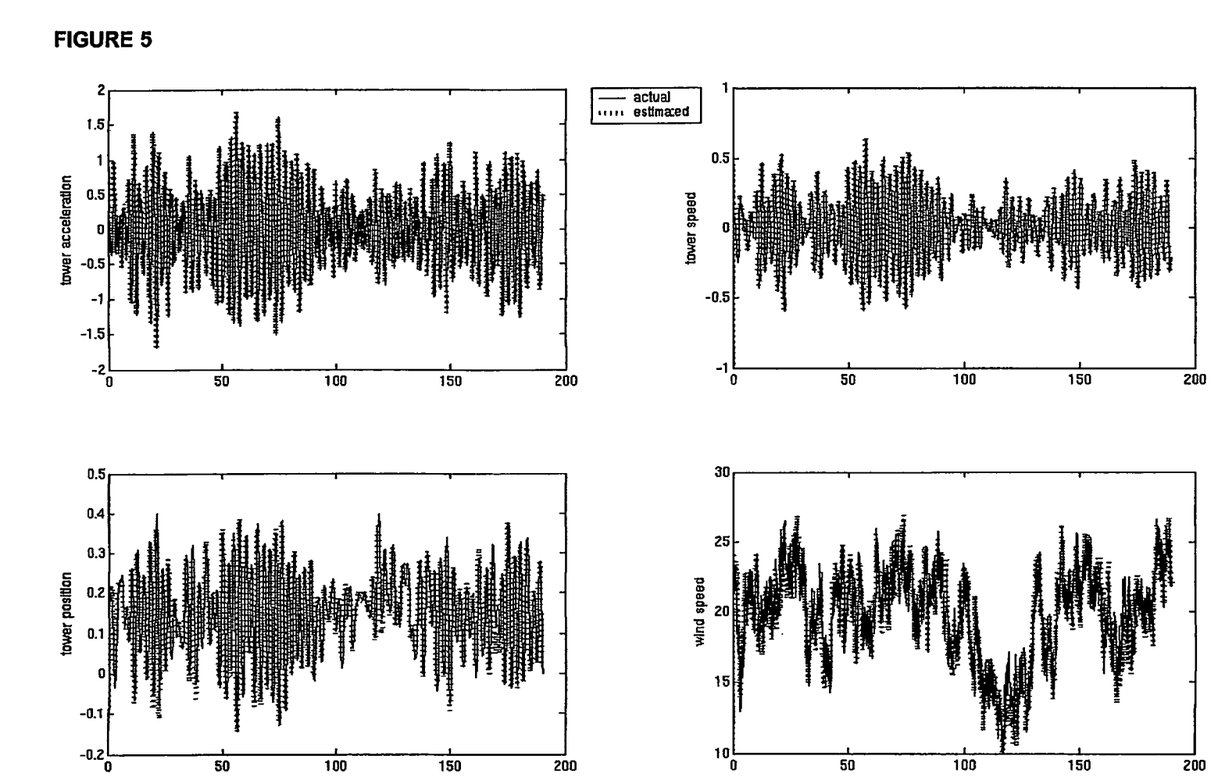
FIG. 5 comprises four graphs in which actual sensed parameters versus estimated values are plotted; and, FIG. 6 is a graph in which the actual wind speed and the estimated wind speed are plotted.

FIG. 5 comprises four graphs in which actual sensed parameters versus estimated values are plotted for tower acceleration, tower speed, tower position and wind speed.

Figure 6:
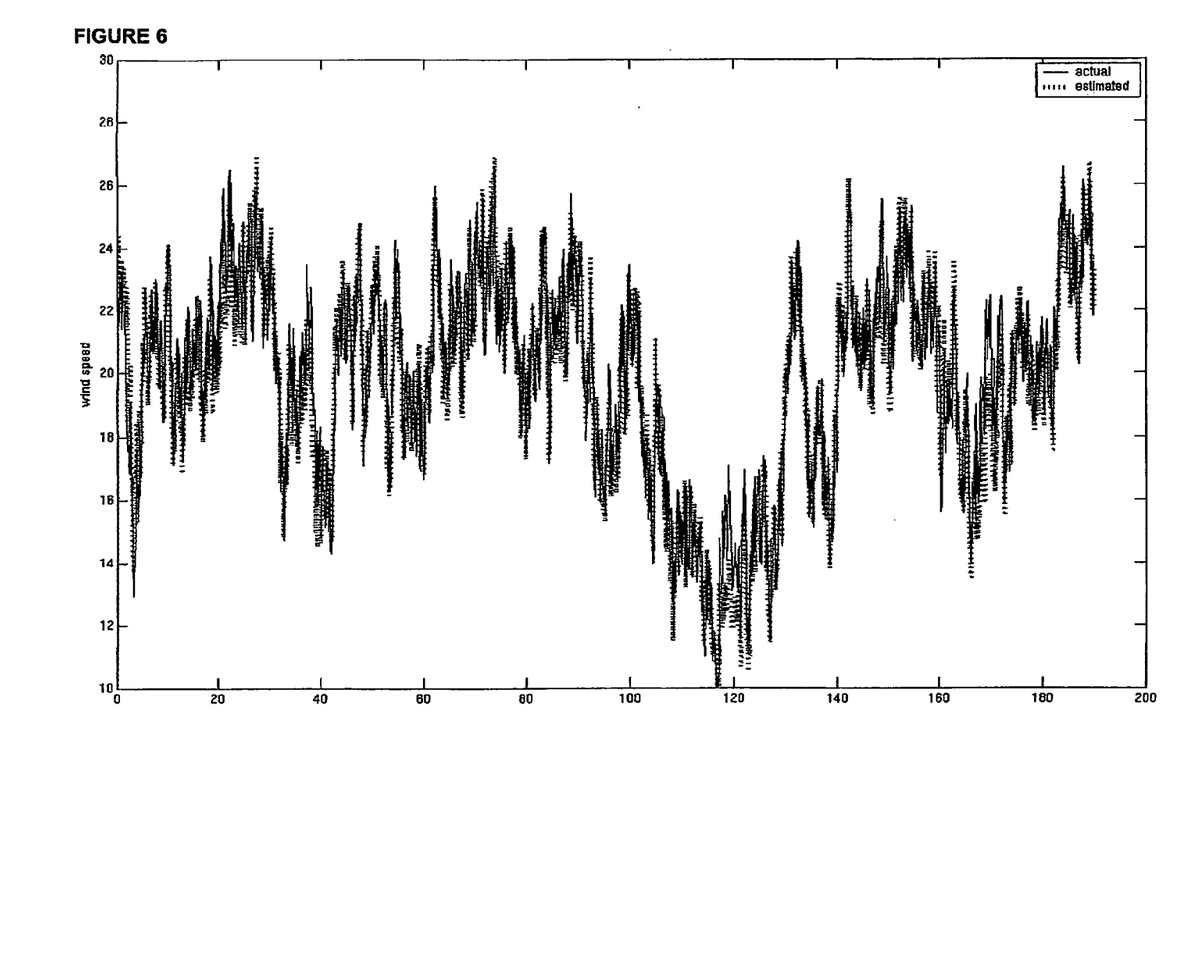

FIG. 6 is a graph in which the actual wind speed and the estimated wind speed are plotted.

The Controller

The equations of the turbine dynamics provide the basis for a controller using the wind flow and tower motion estimated values for improved turbine control and tower motion damping. The turbine response to wind flow and to tower motion are described and conventional (PI, PID, etc.) feedback control system design techniques are applied to design a controller with gains and command outputs that adapt to changing wind flow, changing tower motion, changing rotor rotation rate, and also damp the tower motion by appropriately modulating the blade pitch/length and generator torque. Alternately the controller is of the state space form with the estimator embedded within it.

It should be understood by those skilled in the art that the term "support structure motion" and "tower motion" as used herein includes position, velocity, acceleration, and other expressions of motion.

It should be understood by those skilled in the art that the term "support structure" as used herein includes structures such as tethers wherein cables hold devices buoyed by water or lighter-than-air devices.

It should be understood by those skilled in the art that the terms "wind flow and "fluid-flow" as used herein includes other than wind speed and fluid speed values (such as but not limited to acceleration, correlations, etc.) used by other fluid-flow dynamic models.

It will be understood by those skilled in the art that controllers may not use the wind speed itself, but the support structure dynamics determined during the fluid-flow estimation procedure.

While the invention has been particularly shown and described with reference to preferred embodiments thereof, it will be understood by those skilled in the art that the foregoing and other changes in form and detail may be made therein without departing from the scope of the invention.

What is claimed is:

1. For use with a fluid-flow turbine mounted on a support structure having a back-and-forth motion responsive to the flow of a fluid, a fluid flow estimator comprising:
    a first input including one of rotor speed and a blade parameter;
    a position sensor;
    an output of said position sensor being back-and-forth position of said support structure; and,
    an estimator using said first input and said position sensor output to calculate an estimated fluid flow.

2. A turbine control apparatus in a fluid-flow turbine mounted on a support structure, the structure having a back-and-forth position responsive to the fluid flow, the control apparatus comprising:
    a first sensor including one or more of a rotor speed sensor and
    a blade parameter sensor;
    at least one support structure back-and-forth position sensor; and,
    a fluid flow estimator connected to said at least one support structure back-and-forth position sensor and to said first sensor, said fluid flow estimator using the sensed support structure back-and-forth position and the sensed rotor speed or blade parameter to calculate an estimated fluid flow.

3. A turbine control apparatus in a fluid-flow turbine mounted on a support structure having a back-and-forth position responsive to the fluid flow, wherein the turbine converts fluid-flow energy into a driving torque applied to a generator rotor using blades responsive to the fluid-flow, the control apparatus comprising:
    at least one turbine support structure position sensor having a measured back-and-forth position output;
    a rotor speed sensor having a rotor speed output;
    a blade parameter sensor having a blade parameter output; and,
    a fluid flow estimator connected to said at least one measured back-and-forth position output, said rotor speed output and said blade parameter output, said fluid flow estimator using said outputs to estimate fluid flow over a swept area of said rotor.

4. The apparatus of claim 3 wherein said sensed blade parameter is one or more of blade pitch angle and blade length, and the rotor speed is adjusted by changing one or more of blade pitch angle and blade length in response to fluid-flow estimation.

5. The apparatus of claim 3 wherein said sensed blade parameter is one or more of blade pitch angle and blade length and the support structure motion is damped by changing one or more of blade pitch angle and blade length in response to fluid-flow estimation.

6. A turbine control apparatus in a fluid-flow turbine mounted atop a support tower wherein the tower has a position responsive to the fluid flow, the turbine converts fluid-flow energy into a driving torque applied to the generator rotor using blades responsive to the fluid-flow, and the control apparatus comprises:
    a fluid flow estimator;
    a tower position sensor, said tower position sensor having a tower position output supplied to said fluid flow estimator;
    a blade pitch angle sensor, a pitch angle output thereof being supplied to said fluid flow estimator;
    a rotor-speed sensor, a rotor-speed output thereof being supplied to said fluid flow estimator;

said fluid flow estimator providing an estimated fluid flow output and estimated tower motion output; and a rotor speed control utilizing said estimated fluid flow output, estimated tower motion output, pitch angle output, and rotor-speed output to generate at least one control output that alters the rotor speed.

7. The turbine control apparatus of claim 6 wherein said rotor speed control adjusts one or more of rotor blade pitch angle and blade length in a manner to adjust the rotor speed.

8. The turbine control apparatus of claim 6 further comprising a tower motion damper that adjusts one or more of rotor blade pitch angle and blade length in a manner to damp tower motion.

9. A turbine control apparatus for a fluid-flow turbine mounted atop a support tower having a position responsive to the fluid flow and, wherein the turbine includes a rotor turned by blades responsive to the fluid flow, the control apparatus comprises:

a first sensor including one or more of a rotor speed sensor and a blade parameter sensor;

a tower back-and-forth position sensor;

a fluid flow estimator connected to said tower back-and-forth position sensor, and to said first sensor, said fluid flow estimator having an estimated fluid flow output calculated using said tower back-and-forth position and one or more of said rotor speed and blade parameter; and, a turbine control connected to said fluid-flow estimator output, an output of said turbine control being at least one command effecting turbine rotor speed control in response to said estimated fluid flow.

10. The apparatus of claim 9 further comprising:

a blade parameter sensor, an output of which is one or more of blade pitch angle and blade length;

said blade parameter sensor output being an input to said turbine control.

11. The apparatus of claim 9 wherein said command effecting turbine rotor speed control changes a blade parameter.

12. The apparatus of claim 11 wherein said blade parameter is one or more of blade pitch angle and blade length.

13. For use with a support structure having a position responsive to the flow of a fluid, a method for estimating fluid flow comprising steps of:

sensing support structure position; and, calculating an estimated fluid flow using support structure position.

14. For use in a control apparatus for a fluid-flow turbine held in place by a support structure having a position responsive to the fluid flow, wherein the turbine converts fluid-flow energy into a driving torque applied to the generator rotor using blades responsive to the fluid-flow, a method for estimating fluid flow comprising steps of:

sensing support structure back-and-forth position;

calculating an estimated fluid flow using support structure position; and, using said estimated fluid flow to control said turbine.

15. A control method for a fluid-flow turbine mounted on a support structure having a back-and-forth position responsive to the fluid flow, the control method comprising steps of:

A. sensing support structure back-and-forth position, rotor speed, and a blade parameter;

B. calculating an estimated fluid flow using the sensed support structure back-and-forth position, rotor speed and blade parameter; and, C. controlling turbine rotor speed in response to said fluid flow estimation.

16. The method of claim 15 wherein, in step C, the turbine rotor speed is controlled by changing a blade parameter.

17. The method of claim 15 wherein, in step A, the sensed blade parameter is one or more of blade pitch angle and blade length and, in step C, the turbine rotor speed is controlled by changing one or more of blade pitch angle and blade length.

18. A turbine control method for a fluid-flow turbine held in place by a support structure having a back-and-forth position responsive to the fluid flow, the turbine including a rotor having blades responsive to the fluid-flow, said method comprising steps of:

A. calculating an estimated fluid flow using measured support structure back-and-forth position; and, B. controlling turbine rotor speed in response to said fluid flow estimation.

19. The method of claim 18 wherein step A includes using one or more of rotor speed, blade pitch angle and blade length in said calculating step.

20. The method of claim 19 wherein step B adjusts one or more of rotor blade pitch angle and blade length in a manner to adjust the rotor speed.

21. The method of claim 19 wherein step B adjusts one or more of rotor blade pitch angle and blade length in a manner to damp support structure motion.

22. A method for controlling a fluid-flow turbine held in place by a support tower having a position responsive to the fluid flow, the turbine including a rotor responsive to the fluid-flow, said method comprising steps of:

A. estimating initial fluid flow speed and tower motion;

B. sensing tower motion and rotor rotation rate, resulting in sensed parameters;

C. estimating fluid-flow speed and tower motion by a fluid flow estimator using said sensed parameters and prior estimates of fluid flow and tower motion;

D. calculating at least one desired control output using estimated fluid-flow speed; and, E. sending said at least one desired control output as a command to said turbine.

23. The method of claim 22 wherein said fluid-flow turbine includes a generator turned by said rotor, the rotor having blades responsive to the fluid flow, the turbine is blade pitch-angle regulated, and wherein said step B include s sensing the blade pitch angle;

said step D includes calculating a desired blade pitch angle, desired rotor speed, and desired generator torque using said sensed rotor speed, sensed blade pitch angle, estimated tower motion, estimated fluid-flow speed; and, said step E desired control output includes said desired blade pitch angle as a command to a rotor blade pitch actuator, and desired generator torque as a command to a generator torque actuator.

24. The method of claim 22 wherein said fluid-flow turbine includes a generator turned by said rotor, the rotor having blades responsive to the fluid flow, the turbine is blade length regulated, and wherein said step B includes sensing the blade length;

said step D includes calculating a desired blade length, desired rotor speed, and desired generator torque using said sensed rotor speed, sensed blade length, estimated tower motion, estimated fluid-flow speed; and, said step E desired control output includes said desired blade length as a command to a rotor blade length actuator, and desired generator torque as a command to a generator torque actuator.

* * * * *